(12) United States Patent
Stultz et al.

(10) Patent No.: US 8,320,417 B2
(45) Date of Patent: Nov. 27, 2012

(54) EYE-SAFE Q-SWITCHED SHORT PULSE FIBER LASER

(75) Inventors: Robert Stultz, Cypress, CA (US); David M. Filgas, Newbury Park, CA (US); Michael Ushinsky, Irvine, CA (US)

(73) Assignee: Raytheon Company, Waltham, MA (US)

( * ) Notice: Subject to any disclaimer, the term of this patent is extended or adjusted under 35 U.S.C. 154(b) by 7 days.

(21) Appl. No.: 13/017,648

(22) Filed: Jan. 31, 2011

(65) Prior Publication Data
US 2012/0195343 A1    Aug. 2, 2012

(51) Int. Cl.
*H01S 3/098* (2006.01)
(52) U.S. Cl. ............................................. 372/19; 372/18
(58) Field of Classification Search ................ 372/6, 18, 372/19
See application file for complete search history.

(56) References Cited

U.S. PATENT DOCUMENTS

| 6,683,894 B1 * | 1/2004 | Lee et al. ......................... 372/20 |
| 2009/0201953 A1 * | 8/2009 | Peyghambarian et al. ....... 372/6 |

* cited by examiner

*Primary Examiner* — Armando Rodriguez

(57) ABSTRACT

A laser includes a pump source that provides pump energy at a first wavelength and a laser cavity. The laser cavity includes a laser gain medium that receives the pump energy from the pump source and creates gain at a second wavelength different from the first wavelength, and a mode stripping portion coupled to the laser gain medium. The mode stripping portion causes the laser cavity to have a low Fresnel number so as to allow only the lowest-order fiber mode to resonate in the laser cavity. Higher-order fiber modes are discriminated against so as to generate a laser output having a substantially diffraction limited beam in a single transverse mode at the second wavelength.

24 Claims, 5 Drawing Sheets

EYE-SAFE Q-SWITCHED SHORT PULSE FIBER LASER

BACKGROUND

The present disclosure relates to a method for producing a substantially single mode laser pulses and a laser for producing the same.

When a beam of light enters the eye, the beam passes through the cornea, lens, and the vitreous humor. The portion of the beam that is not absorbed is focused by the eye lens onto the retina. Under normal conditions, the light energy is converted by the retina into chemical energy, stimulating optical sensations. Laser beams with wavelengths longer than about 2.2 μm are strongly absorbed by the cornea and can cause damage to the cornea. Laser beams with wavelengths shorter than about 1.4 μm are not absorbed in the cornea or vitreous humor and therefore can cause damage to the retina. Laser beams having a wavelength in the range of 1.5 μm to 2.2 μm are not absorbed by the cornea, but are completely absorbed by the vitreous humor of the eye thereby alleviating any damage to the retina. Therefore, laser beams having a wavelength in the range of 1.5 μm to 2.2 μm are generally considered to be "eye-safe" lasers.

It is always desirable to have a powerful laser beam while still maintaining the quality of such laser beam. Beam quality is typically measured by how fast a laser beam grows in size as it propagates along, relative to that of an ideal beam. Examples of ideal beams are top hat and gaussian beams. An ideal top hat beam starts out with a uniform intensity across an aperture and a flat phase front. A gaussian beam has a bell-shaped intensity profile and a flat phase front. Another example of an ideal beam is the lowest-order mode of an optical fiber. A diffraction-limited laser beam is one that grows in size at a rate equal to that of an ideal beam.

Multi-mode fibers are optical fibers with a relatively large core area that can support multiple propagation modes. In contrast, a single-mode fiber has a substantially smaller core area and is able to support only one propagation mode. Typical core diameters for single-mode fibers are around 9 microns, whereas the core diameters of multi-mode fibers can reach hundreds of microns.

Q-switched pulses are energetic pulses produced by lasers by rapidly switching the Q factor (or quality factor) of a laser resonator from low to high. A high Q factor corresponds to low resonator losses per round trip, and a low Q factor to high round trip losses. This is normally accomplished using a variable attenuator inside the resonator cavity. In passively Q-switched lasers, the variable attenuator is a saturable absorber. A saturable absorber has a low transmittance (high loss) initially, but quickly increases its transmittance (low loss) when the intensity in the resonator cavity reaches a high enough level. Q-switched laser pulses can range from tens of picoseconds to hundreds of nanoseconds, with peak powers ranging from kilowatts to Gigawatts.

Microchip lasers do not employ pump guiding and are therefore limited to short cavity lengths to achieve sufficient coupling between diode pump and laser signal beams due to faster spreading (lower beam quality) of diode pump light. The short microchip cavity results in a correspondingly small lowest-order transverse laser mode diameter. Prior attempts to achieve a larger signal beam diameter in a microchip laser by increasing the pump beam diameter, resulted in the excitation of multiple signal transverse modes. This causes an increase in laser pulse width or multiple pulsing, and a degradation in signal beam quality. In eye-safe microchip lasers (i.e., microchip lasers having an eye-safe wavelength radiation), Erbium ion concentration is limited by up conversion effects, thus further limiting the achievable gain. For all these reasons, the output pulse energy of a sub-nanosecond microchip laser is typically only a few microjoules (at best). Generation of nanosecond eye-safe laser pulses with an optical parametric oscillator (OPO) is problematic. This is due to the fact that a long pump pulse is required for the signal beam to build-up from noise in the OPO cavity. In an OPO, the pump energy is stored in the electromagnetic field of the pump beam, and not in an excited state of a laser ion such as Erbium. This means the OPO signal beam will have a similarly long pulse width. An optical parametric amplifier (OPA) has been used to generate short 1.5 μm pulses but it requires a sub-nanosecond, high pulse energy pump laser and many passes through an OPA crystal. Typical conversion efficiency from pump to signal is only 25-30%. This OPA architecture is significantly larger and more complex than a microchip laser. Also, using this as a master oscillator (MO) seed for an Erbium-doped amplifier is difficult since its wavelength must be closely matched to that of the amplifier. Mode-locked Erbium lasers can also be used to generate sub-nanosecond pulses at 1.5 μm, but are extremely large and complex.

The present disclosure provides improvements over the prior art methods for producing a substantially single mode laser pulses.

SUMMARY

One embodiment relates to a laser that includes a pump source and a laser cavity. The pump source provides pump energy at a first wavelength. The laser cavity includes a laser gain medium and a mode stripping portion coupled to the laser gain medium. The laser gain medium receives the pump energy from the pump source and creates gain at a second wavelength different from the first wavelength. The mode stripping portion discriminates against any higher-order fiber modes so as to generate a laser output having a substantially diffraction limited beam in a single transverse mode at the second wavelength. The mode stripping portion is configured to allow only a lowest-order fiber mode to build-up in the laser cavity.

Another embodiment relates to a method for producing a substantially single mode laser pulses. The method includes providing pump energy at a first wavelength to a laser gain medium in a laser cavity to create gain at a second wavelength different from the first wavelength; coupling a mode stripping portion to the laser gain medium to favor a lowest-order fiber mode while discriminating against any higher order modes; and using the mode stripping portion to discriminate against the higher-order fiber modes and to allow only the lowest-order fiber mode to build-up in the laser cavity so as to generate a laser output having a substantially diffraction limited beam in a single transverse mode at the second wavelength.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a method for obtaining short (e.g., ≦one nanosecond (ns), Full Width Half Maximum (FWHM)) Q-switched pulses at an eye-safe wavelength in a diffraction-limited beam. The present disclosure utilizes a multi-mode, laser-active fiber to provide higher pulse energy than achievable with a single-mode fiber. Diffraction-limited operation (i.e., single transverse mode) is obtained by employing a short unguided region in the laser cavity. In the short unguided region, higher-order modes spread out faster than the lowest-order mode and therefore couple less efficiently back into the fiber. This results in higher round-trip losses for the higher-order fiber modes, and causes only the lowest-order fiber mode to build up in the laser or resonator cavity. As shown and explained in the discussion below, the unguided gap length is selected so that the lowest-order mode round-trip loss is sufficiently low (e.g., less than 5%), while at the same time higher-order modes are sufficiently discriminated against. In one embodiment, the higher-order modes may have losses more than two times higher than the lowest-order mode. In addition, the fiber architecture of the present disclosure provides an efficient coupling of pump and laser light over significantly larger gain lengths than achievable with a conventional microchip laser.

The laser of the present disclosure is just as compact as a conventional microchip laser, but enables a larger lowest-order mode size and therefore significantly higher pulse energy (larger stored energy volume) due to its use of a large mode area fiber. The laser of the present disclosure provides a natural means of discriminating against higher-order transverse modes by use of a thin unguided region in the resonator cavity. The fiber architecture of this laser allows efficient pump/signal coupling over significantly longer gain lengths compared with the conventional microchip lasers.

Figure 1:
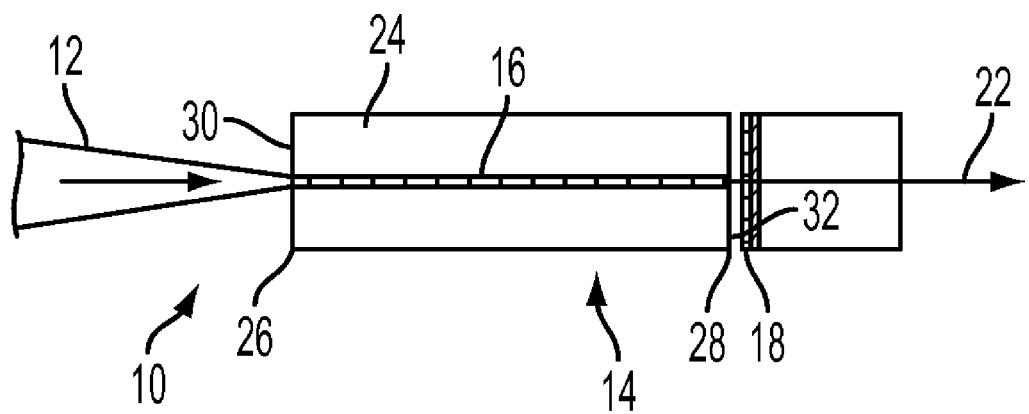
FIG. 1 is an exemplary laser in accordance with an embodiment of the present disclosure.

FIG. 1 illustrates exemplary laser 10 in accordance with an embodiment of the present disclosure. Laser 10 includes pump source 12 and laser cavity 14. Pump source 12 provides pump energy at a first wavelength. In one embodiment, pump source 12 is a laser diode producing pump energy at wavelengths between 915 and 985 nm.

Laser cavity 14 includes laser gain medium 16 and mode stripping portion 18 coupled to laser gain medium 16. Laser gain medium 16 receives the pump energy at the first wavelength from pump source 12 and creates gain at a second wavelength different from the first wavelength. Mode stripping portion 18 discriminates against the build-up of any higher-order fiber modes so as to generate laser output 22 having a substantially diffraction limited beam in a single transverse mode at the second wavelength (i.e., different from the first wavelength). Mode stripping portion 18 is configured to allow only the lowest-order fiber mode to resonate in laser cavity 14. All resonator cavity modes are generated by spontaneous emission noise in the laser gain medium, but due to the presence of mode stripping portion 18, the lowest-order mode has significantly lower round-trip diffraction loss than any of the other modes. As a result, the lowest-order mode has the highest net round-trip amplification causing it to increase in power (build-up) at a much faster rate than any of the other modes. The second wavelength is an eye-safe wavelength that ranges between 1.5 µm and 2.2 µm. In one embodiment, the first wavelength or the pump wavelength is generally around 940 nm and the second wavelength is generally around 1.5 µm. In one embodiment, "build-up" used herein refers to resonate, amplify or attenuate the fiber mode(s) in the laser cavity.

In one embodiment, laser gain medium 16 is an optical fiber. Laser gain medium or fiber 16 includes a laser-active fiber core that is enclosed in or surrounded by a cladding. The core comprises a phosphate glass core, co-doped with Erbium (Er) and Ytterbium (Yb). That is, the core is doped with a laser-active material (e.g., Ytterbium (Yb), or Erbium (Er)) making the fiber a laser-active fiber. The core has a diameter of 50 µm or more. The cladding comprises an undoped phosphate glass cladding.

In one embodiment, pump source 12 pumps the pump energy via the core of laser gain medium 16. In another embodiment, pump source 12 pumps the pump energy via the cladding of the laser gain medium 16.

As shown in FIG. 1, ferrule assembly 24 surrounds laser gain medium 16. Ferrule assembly 24 holds laser gain medium 16 in place and removes the heat generated in laser gain medium 16. Ferrule assembly 24 comprises a thermally-conductive material.

In one embodiment, both ends 26 and 28 of laser gain medium 16 are polished flat and parallel. Laser gain medium 16 includes at least two reflective surfaces 30 and 32 that are spaced apart from one another to define ends 26 and 28 of laser gain medium 16. Dichroic coatings are applied to reflective surfaces 30 and 32. Dichroic coated surface 30 is highly-reflective (HR) at the laser wavelength & highly-transmissive (HT) at the pump wavelength, and dichroic coated surface 32 is highly-reflective (HR) at the pump wavelength and anti-reflective (AR) at the laser wavelength. Surface 30 serves as the highly-reflective (HR) end of the 1.5 μm resonator cavity, and surface 32 provides two-pass pumping by reflecting the unabsorbed pump light back into the core of the fiber.

Second laser output 22 includes laser pulses at an eye-safe wavelength (i.e., wavelength of approximately 1.5 μm). These laser pulses have a full-width at half-maximum (FWHM) pulse width and a duration of less than one ns.

Mode stripping portion 18 includes a passive Q-switch layer. The passive Q-switch layer includes a Cobalt-doped Spinel material. That is, a thin layer of passive Q-switch material (Cobalt-doped Spinel) is selected as the unguided portion or mode stripping portion 18 of the resonator cavity.

Figure 2:
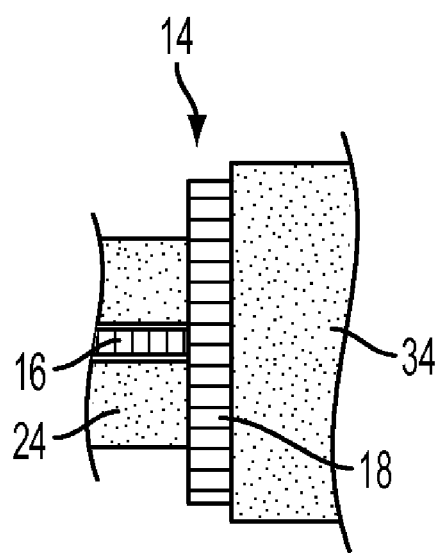
FIG. 2 illustrates a mode stripping portion sandwiched between fiber-ferrule assembly of the laser and a separate resonator cavity mirror in accordance with an embodiment of the present disclosure.

In one embodiment, as shown in FIG. 2, mode stripping portion 18 is disposed between laser gain medium 16 of laser 10 and laser outcoupler mirror 34. That is, the thin layer of passive Q-switch material (Cobalt-doped Spinel) may be sandwiched between separate resonator cavity mirror 34 and fiber-ferrule end 28 of laser 10. In one embodiment, the construction, the arrangement, and the operation of laser outcoupler mirror 34 is similar to that of laser 10.

Figure 3:
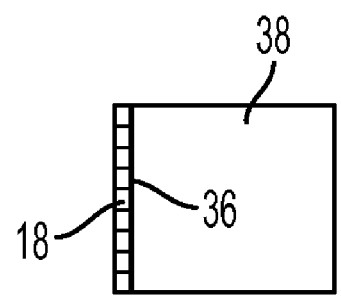
FIG. 3 illustrates the mode stripping portion bonded to a supporting substrate having a reflective interface coating in accordance with an embodiment of the present disclosure.

In another embodiment, as shown in FIG. 3, mode stripping portion 18 is disposed on reflective interface coating 36 of supporting substrate 38. That is, reflective interface coating 36 is in between mode stripping portion 18 and supporting substrate 38. Supporting substrate 38 with mode stripping portion 18 is placed against end (26 or 28) of laser gain medium 16. In one embodiment, supporting substrate 38 is a undoped YAG crystal. Supporting substrate 38 provides structural strength or stability to mode stripping portion 18. Mode stripping portion 18 may be bonded to transparent substrate 38 (with interface coating 36) to provide a monolithic resonator mirror structure. Such monolithic resonator mirror structure may then be butted up against fiber-ferrule assembly's end 26 or 28. In one embodiment, reflective interface coating 36 may serve as a resonator outcoupler.

In one embodiment, mode stripping portion 18 is disposed at pump end 26 of laser gain medium 16. It is possible to place the thin passive Q-switch Cobalt-doped Spinel portion or mode stripping portion 18 at pump end 26 of the fiber-ferrule assembly because the Co:Spinel material is transparent at the pump wavelength (i.e., around 940 nm) for Er,Yb:glass core. In such embodiment, reflective surface 30 at pump end 26 of laser gain medium 16 includes an anti-reflective coating at both pump wavelength and laser wavelength, and the reflective surface 32 at output end 28 of laser gain medium 16 includes a photorefractive coating that is nominally 100% reflective at both the laser wavelength and the pump wavelength.

In another embodiment, mode stripping portion 18 is disposed at output end 28 of laser gain medium 16. In such embodiment, reflective surface 30 at pump end 26 of laser gain medium 16 includes a coating that is highly reflective (nominally 100% reflective) at the pump wavelength and highly transmissive at the laser wavelength. Reflective surface 32 at output end 28 of laser gain medium 16 includes a coating that is anti-reflective at the laser wavelength and nominally 100% reflective at the pump wavelength.

A diffractive resonator analysis was performed as explained with respect to FIGS. 4-8B. This diffractive resonator analysis was performed to analyze the laser of the present disclosure to determine whether the laser is limited to a single lowest-order mode. In other words, this diffractive resonator analysis was performed to determine whether the laser discriminates higher-order modes.

A resonator was diffractively modeled using GLAD physical optics program. GLAD is an optical design software program that is available from Applied Optics Research®. The diffractive resonator analysis was based on an angular spectrum propagator diffractive method or code, which models the propagation of a wave field.

A fiber having a length of 5 mm, a core diameter of 50 μm, and a numerical aperture of 0.05 was simulated using split-step propagation procedure. In this simulation, the split-step propagation procedure computes the solution in small steps by iteratively applying the refractive step index (FIG. 4) of the fiber core and cladding as a phase profile, followed by a short propagation step.

Figure 4:
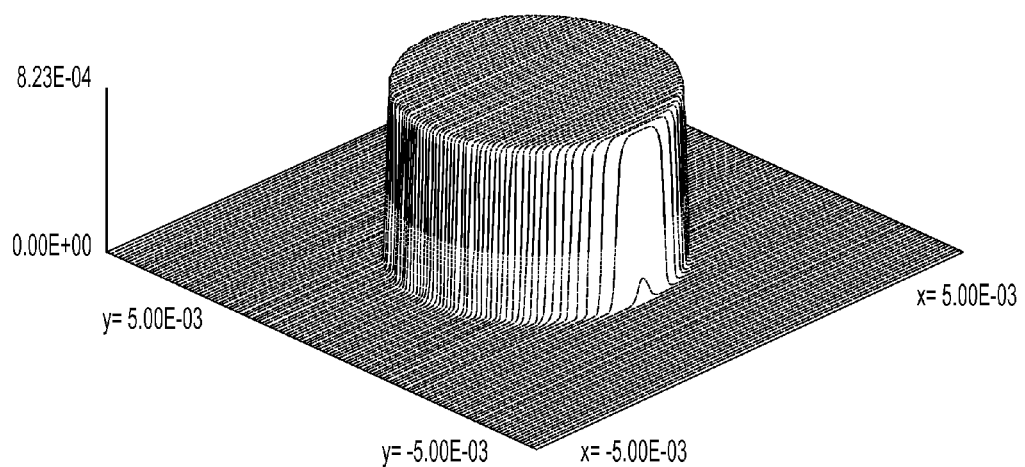
FIG. 4 illustrates a step index applied as phase profile prior to each propagation step in fiber.

FIG. 4 shows the $\Delta n$ ($=n_{core}-n_{clad}$) step index applied as phase profile prior to each propagation step ($\Delta z$) in fiber. The step index $\Delta n$ was determined from the numerical aperture (NA) of 0.05 using NA$=(n_{core}^2-n_{clad}^2)^{1/2}$. The size of $\Delta z$ was such that $\Delta z \Delta n$ is less than $\lambda/180$ (where $\lambda$=the wave length). A total of 500 split-steps were performed over each pass through the 5 mm long fiber. In the model shown in FIG. 4, it was assumed that the core has higher refractive index than the cladding.

The Normalized Frequency Parameter of a fiber is called the V number. The V number is expressed as V=$(2\pi a/\lambda)$NA where a is the fiber core radius, $\lambda$ is the wavelength, and NA is the numerical aperture of the fiber. Since the V number of this fiber is equal to 5.12, this fiber configuration supports multiple transverse modes (as shown and explained with respect to FIGS. 8A and 8B). The V number of the fiber must be less than 2.405 in order for a step index fiber to become a single mode (for a given wavelength). The unguided portion of the simulated resonator was 300 μm thick and had an index of 1.7 (corresponding to the refractive index of Co:Spinel).

The resonator beam array in the model was initially populated with a field having random intensity and phase (noise). This array was propagated a total of 300 round trips in the resonator cavity, and the total energy of the array was renormalized after each round trip. There was no aperture used in the resonator cavity. In order to prevent aliasing, light that escaped from the fiber core was clipped at the extreme edge of the beam array. The physical size of the beam array was several times larger than the fiber core diameter, so the losses of the propagating core modes were not affected by the clipping at the edge of the array.

In order to demonstrate transverse mode discrimination, a second beam array was also propagated at the same time in the resonator model. The second beam array field ($\psi 2$) was also initialized with noise as with the first array, but constrained always to be orthogonal to the first (unconstrained) beam array field ($\psi 1$) by continuously subtracting out the parallel component according the following equation:

$$\psi_{\perp} = \psi_2 - \frac{\int \psi_1^* \psi_2 dA}{\int |\psi_1|^2 dA} \psi_1 \qquad \text{Equation (1)}$$

That is, by constraining the second beam array field ($\psi 2$) to be orthogonal to the first (unconstrained) beam array field ($\psi 1$), the next higher-order mode was simulated in the cavity. Once the higher-order modes were simulated, the amount of diffractive loss (round-trip loss) for each mode was measured or calculated.

Figure 5:
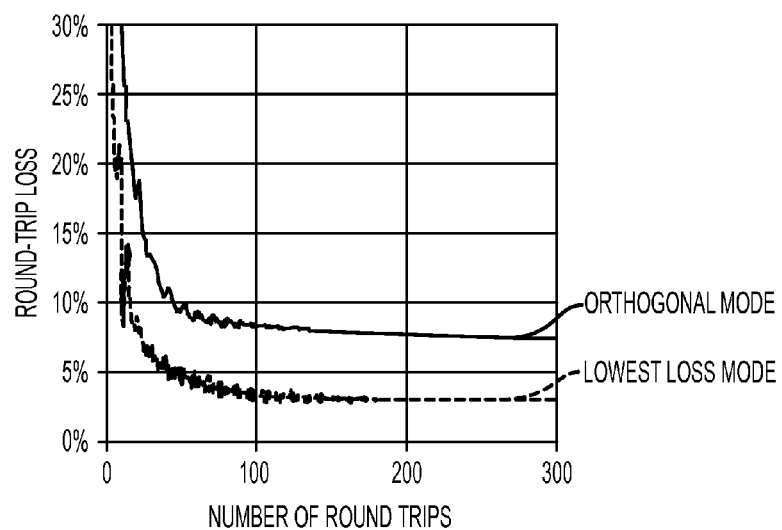
FIG. 5 illustrates round-trip losses for lowest-loss mode and the corresponding orthogonal mode in accordance with an embodiment of the present disclosure.

Round-trip loss or background loss β determines what part of the energy of the laser becomes unusable at each round-trip (i.e., it can be absorbed or scattered). In this case, the loss corresponds to light that after one round-trip is not guided by the fiber core and is therefore lost into the cladding. The round-trip loss calculated for each of the propagating beam modes was plotted in the graph shown in FIG. 5. For example, FIG. 5 shows the round-trip losses for the lowest-order mode, and the corresponding orthogonal mode or next higher order mode. In the graph of FIG. 5, the Y-axis represents round-trip losses and the X-axis represents the number of round trips.

After 300 round trips, the lowest-order mode converged to a round-trip loss of about 3%, but the orthogonal mode had a round-trip loss of 7.5%. That is, the round-trip loss of orthogonal mode is more than 2 times higher than the round-trip loss of the lowest-order mode. The analysis confirmed that the laser of the present disclosure provides higher losses for higher-order modes than for first or any lowest-order modes, such that higher-order modes are discriminated against.

Figure 6A:
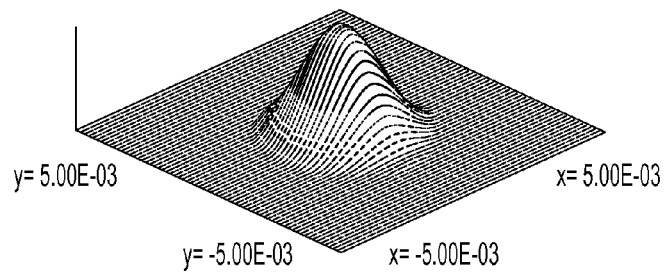
FIGS. 6A and 6B illustrate final beam intensity profile inside the fiber and in far-field, respectively, in accordance with an embodiment of the present disclosure.
Figure 6B:
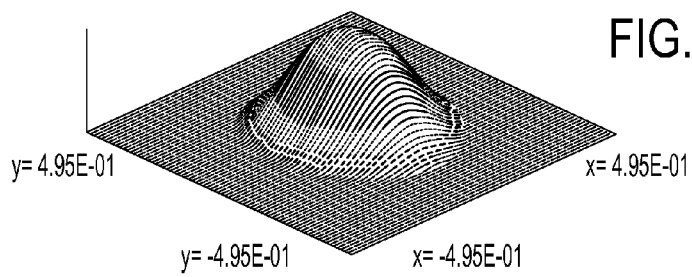

The lowest-order (unconstrained) mode array converged to a near-field beam intensity profile is shown in FIG. 6A, and its corresponding far-field beam intensity profile is shown in FIG. 6B. The near-field beam intensity profile shown in FIG. 6A is a profile of the beam obtained at the exit of the fiber (i.e., in the region around the end of the fiber). The far-field beam intensity profile shown in FIG. 6B is a profile of the beam obtained when the beam is propagated to far-field (i.e., beam propagated very far away from the fiber end). The profiles shown in FIGS. 6A and 6B are for the lowest-order (unconstrained) mode array.

Figure 7:
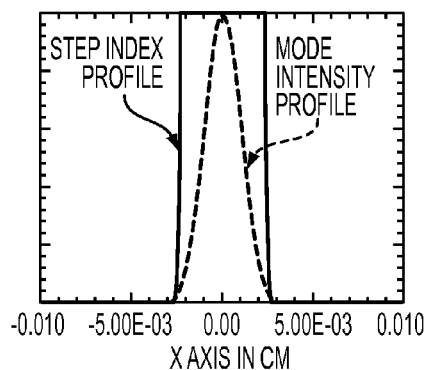
FIG. 7 illustrates final mode intensity profile relative to fiber core step index profile in accordance with an embodiment of the present disclosure.

FIG. 7 shows the near-field intensity profile relative to refractive index step produced by fiber core. The $1/e^2$ diameter of the near-field beam was 39.3 μm, and that of the far-field beam was 53.5 mrad. If analyzed as a Gaussian beam, this corresponds to less than 1.1 times diffraction limit.

As a check on the model and as a demonstration of a key component of the present disclosure, a run was made with no unguided region. In the case where the resonator had no unguided region, neither beam array converged to the lowest-order fiber mode, but instead both presented the combination of several higher-order modes. The beam quality of such a resonator is substantially reduced because of the presence of higher-order modes. In the case, where the resonator had no unguided region, the beam modes (after 300 round trips) are displayed in FIGS. 8A and 8B, respectively. The corresponding round-trip losses were 0.0% and 0.7%. This clearly shows that the fiber resonator supports multiple fiber mode orders in the absence of an unguided region.

Figure 8A:
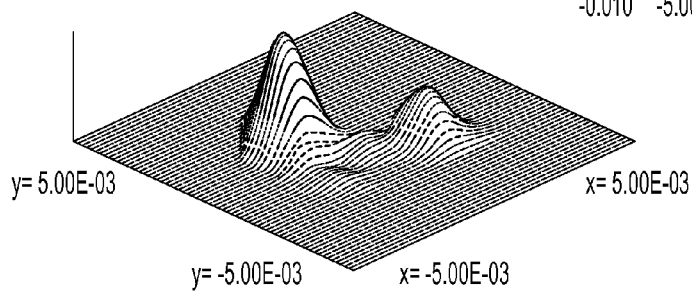
FIGS. 8A and 8B illustrate lowest-loss mode and orthogonal mode without the mode stripping portion in the fiber resonator.
Figure 8B:
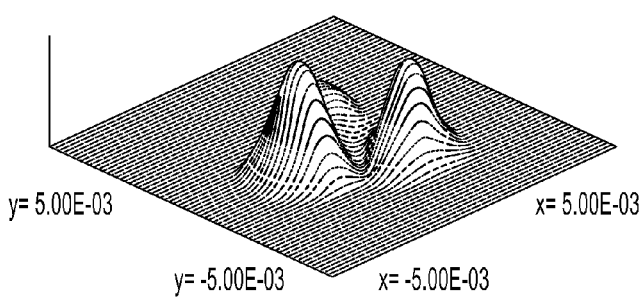

A comparison between FIG. 8A and FIG. 6A and between FIG. 8B and FIG. 6B clearly illustrates the effect of the unguided region in the laser of the present disclosure. As shown in FIGS. 8A and 8B, without the thin unguided Q-switch Co-Spinel portion, the laser of the present disclosure produces several high-order fiber modes. When the thin unguided Q-switch Co-Spinel portion is introduced in the laser of the present disclosure, the laser discriminates against any higher-order fiber modes and allows only a lowest-order fiber mode to resonate in laser cavity. Even though the fiber used in the laser resonator of the present disclosure is capable of supporting several higher-order modes (multi-mode fiber), these higher-order modes are discriminated against the lowest-order modes in the fiber by the use of the thin unguided Co-Spinel Q-switch portion.

Also, the laser resonator of the present disclosure allows the use of a large sized core. In one embodiment, the core diameter of the laser resonator (of the present disclosure) is larger than the core diameter of the laser resonator, which typically produces lower-order modes. By screening the higher-order modes, the laser resonator of the present disclosure allows the use of a larger sized core to produce higher pulse energy. For example, a single mode fiber (that only supports a single mode) includes a core diameter of less than 10 μm and produces significantly less pulse energy than the laser resonator (of the present disclosure) that uses a core diameter of 50 μm or more. The laser resonator of the present disclosure maintains a single order mode (by discriminating higher-order modes) and uses larger core size (a diameter of 50 μm or more) to produce high pulse energy. In one embodiment, the pulse energy produced by the laser resonator of the present disclosure is, for example, 25 times higher than the pulse energy produced by the single mode fiber (that only supports a single mode).

Fresnel number of a laser resonator is calculated by taking into account the core diameter of the laser and the thickness of the unguided portion. The present disclosure provides a low Fresnel number resonator that provides good discrimination of higher-order modes.

A laser kinetics study and thermal analysis were performed on the laser (of the present disclosure) as explained below. Two fiber configurations were modeled using a MATLAB®-based end-pumped Er,Yb:Phosphate glass laser kinetics program or code. The model also includes a heat load and Er,Yb fluorescence calculation. The results of the two simulations are summarized in Table I below.

TABLE I

| Fiber configuration | I | II |
|---|---|---|
| Pump wavelength (nm) | 940 | 960 |
| Erbium weight % concentration | 3 | 3 |
| Ytterbium weight % concentration | 15 | 15 |
| Fiber core diameter (μm) | 30 | 50 |
| Fiber clad OD (μm) | 125 | 208 |
| Fiber length (mm) | 5 | 20 |
| Pumping type | 'Core' | 'Clad' |
| Resonator outcoupler reflectivity ($R_{oc}$) | 60% | 20% |
| Co: Spinel Q-switch transmittance | 83% | 55% |
| Pulse energy (μJ) | 13 | 101 |
| FWHM pulse width (ns) | 0.91 | 1.05 |
| Intra-cavity fluence (J/cm$^2$) | 8.4 | 8.6 |
| Pulse Repetition Frequency (PRF) (kHz) | 10.6 | 10.0 |
| Incident pump power (W) | 0.75 | 8.00 |
| Absorbed pump power (W) | 0.72 | 4.95 |
| Extracted power (W) | 0.19 | 1.65 |
| Total heat deposited (W) | 0.51 | 3.15 |
| Total fluorescence (W) | 0.02 | 0.15 |
| Peak ΔT—core center to fiber OD (C) | 78 | 63 |

Both fiber configurations are based on phosphate glass fiber core with 3 wt % Erbium & 15 wt % Ytterbium concentrations. Such fibers are available from NP Photonics, Inc.

In configuration I, the clad outer diameter (OD) was selected to be 125 μm and the core diameter was selected to be 30 μm to obtain around 10 μJ pulse energy from the fiber laser. Configuration I used a 5 mm long core-pumped fiber. A 750 mW of pump energy at a pump wavelength of 940 nm was core-pumped into the fiber. The kinetics model predicted a pulse energy of 13 μJ at a pulse repetition frequency (PRF) of 10.6 kHz. Predicted pulse width for this configuration was 0.9 ns. The total heat load of the fiber was about 70% of the absorbed pump power, or about ½ W. If the outer surface of the fiber was cooled, the corresponding peak core temperature relative to the clad outer surface was 78 C. The 750 mW of pump energy for Configuration I was achieved using a single-mode diode.

The core diameter of 50 μm and the clad outer diameter (OD) of 208 μm were selected in Configuration II to obtain around 100 μJ pulse energy. The 208 μm clad OD of Configuration II was scaled from 125 μm of Configuration I so that both fibers could be pulled or drawn from the same preform. In Configuration II, the length of the fiber is 20 mm. This configuration was clad-pumped in order to better distribute the heat load over the fiber length and therefore reduce the peak temperature of the fiber core. Since the available Yb concentration was fixed at 15%, the wavelength was adjusted closer to the Yb absorption peak in order to increase the pump efficiency. 8 W of pump power was required in this configuration, which can be achieved with a single-stripe diode. The predicted pulse energy for Configuration II was 101 μJ at a PRF of 10 kHz. Pulse width for this configuration was around 1 ns. The peak core delta temperature was only 63 C.

Intra-cavity fluence for both configurations is less than 9 J/cm$^2$. This is a typical value (not high) for a Q-switched Erbium laser. Also, resonator outcoupling (1-$R_{oc}$) for both configurations is relatively high (40% and 80%, respectively). This means that the predicted (around) 3% roundtrip diffraction loss of the lowest-order mode does not significantly affect resonator performance.

Co:Spinel with an absorption coefficient of 17 cm$^{-1}$ at a wavelength of 1.53 μm was used as the unguided portion. The Co:Spinel with these characteristics was obtained from Northrup Grumman Synoptics. The Q-switch transmittances are provided in Table I above and were fabricated in 110 and 350 μm thicknesses, respectively. There are no issues with growing crystals with this Cobalt concentration or higher.

Figure 9:
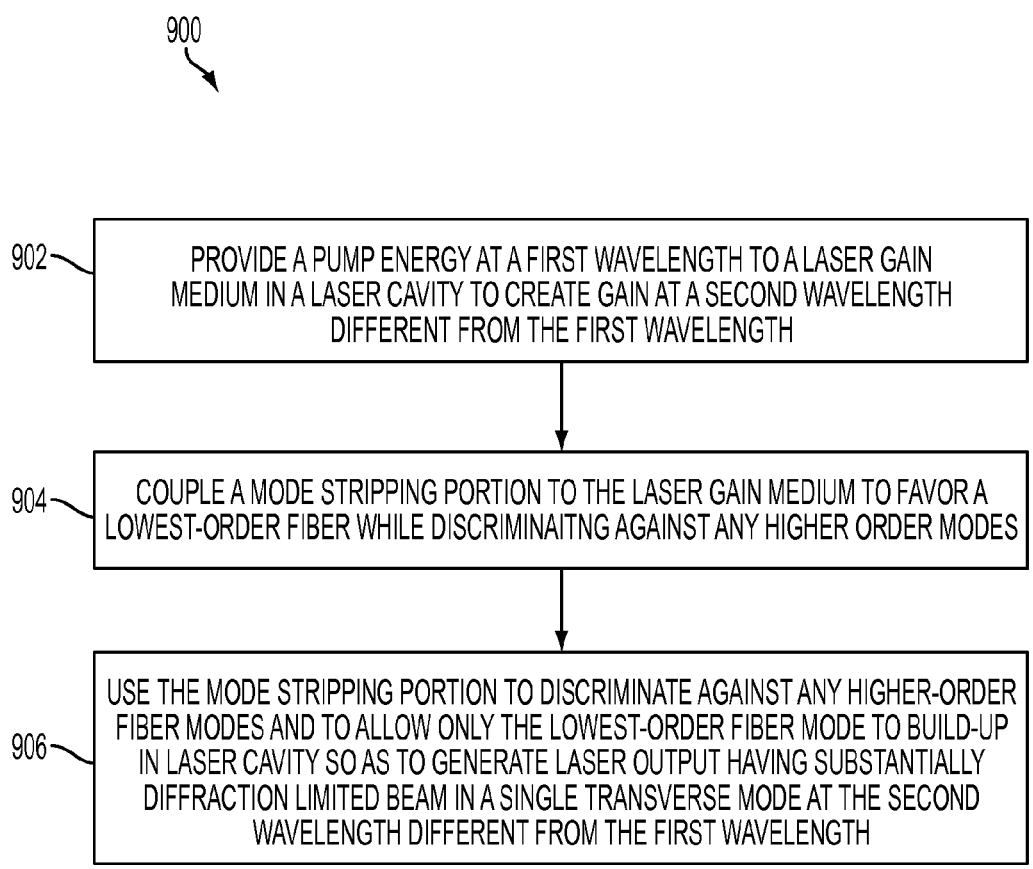
FIG. 9 is a flow chart illustrating a method for producing substantially single mode laser pulses in accordance with an embodiment of the present disclosure.

FIG. 9 is a flow chart illustrating method 900 for producing substantially single mode laser pulses in accordance with an embodiment of the present disclosure. Method 900 begins at procedure 902 in which a pump energy at a first wavelength is provided to laser gain medium 16 in laser cavity 14 to create gain at a second wavelength different from the first wavelength. In one embodiment, the pump energy is provided by a pump source (e.g., pump diode). The first wavelength ranges between 915 and 985 nm. In one embodiment, the pump energy is pumped via the core of the fiber. In another embodiment, the pump energy is pumped via the cladding of the fiber.

Next at procedure 904, mode stripping portion 18 is coupled to laser gain medium 16 to favor the lowest-order fiber mode while discriminating against any higher-order fiber modes. As noted above, mode stripping portion 18 includes a passive Q-switch portion having a Cobalt-doped Spinel material.

At procedure 906, mode stripping portion 18 is used to discriminate against any higher-order fiber modes and to allow only the lowest-order fiber mode to build-up in laser cavity 14 so as to generate a laser output 22 having a substantially diffraction limited beam in a single transverse mode at a second wavelength (i.e., different from the first wavelength). The second wavelength is an eye-safe wavelength that ranges between 1.5 μm and 2.2 μm. In one embodiment, the first wavelength or the pump wavelength is generally around 940 nm and the second wavelength is generally around 1.5 μm.

The present disclosure provides a novel means of obtaining a short (sub-ns) Q-switched laser pulses with a significantly higher pulse energy than achievable with a conventional microchip laser. The size of this laser is as small as a conventional microchip laser. The present disclosure uses a large multi-mode fiber, but provides a means for discriminating against higher-order modes so that the laser output is a single transverse mode. Also, the fiber architecture of this laser provides an efficient coupling of pump and laser light over significantly larger gain lengths than achievable with a conventional microchip laser. Although the above description discusses an Er,Yb: glass fiber at an eye-safe wavelength, the inventive concepts in the present disclosure are equally applicable to other fiber materials and wavelengths.

The present disclosure employs an Er,Yb: glass fiber so that long gain lengths (compared to a conventional microchip) can be achieved with excellent pump/signal power coupling. In addition, a large mode area fiber is used for high pulse energy generation while good beam quality is maintained by use of a thin mode stripping portion (which discriminates against higher-order fiber modes) in the resonator. The unguided region provides a convenient place for a thin passive Q-switch. The laser of the present disclosure is very compact and may be pumped using a single-stripe diode, and is similar to that of a conventional microchip laser. The present disclosure provides short pulse and high beam quality laser source (e.g., at wavelength of 1.5 μm). However, the techniques described in the present disclosure can also be used for systems operating at other wavelengths.

The laser of the present disclosure provides higher beam quality, higher pulse energy and a short cavity length (to produce a nanosecond pulse).

The eye-safe laser of the present disclosure may be used for active sensing platforms or applications, and provides one of the most efficient eye-safe sensing systems. Applications of lasers described in the present disclosure include range finding, eye-safe imaging LADAR (Laser Detection and Ranging), remote sensing, etc. The lasers of the present disclosure may also be used as a master oscillator for an amplifier.

The shorter Q-switched pulses at an eye-safe wavelength produced by the laser of the present disclosure provide improved range resolution to resolve targets in range finding applications (i.e., shorter the pulse better the resolution).

The long interaction length and excellent geometric overlap between pump and lasing mode make the fiber oscillator configuration an attractive alternative to a bulk microchip oscillator for low gain media such as Erbium for multiple man-portable applications, ground applications, airborne applications and space applications. The present disclosure also provides a novel approach using a Co:Spinel passive Q-switch and end reflector in close proximity to the fiber.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. A laser comprising:
   a pump source that is configured to provide pump energy at a first wavelength; and
   a laser cavity comprising:
      a laser gain medium that is configured to receive the pump energy from the pump source and create gain at a second wavelength different from the first wavelength; and
      a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
   wherein the mode stripping portion comprises a passive Q-switch layer.

2. The laser of claim 1, wherein the laser output includes laser pulses at an eye-safe wavelength.

3. A laser comprising:
a pump source that is configured to provide pump energy at a first wavelength; and
a laser cavity comprising:
a laser gain medium that is configured to receive the pump energy from the pump source and create gain at a second wavelength different from the first wavelength; and
a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
wherein the laser output includes laser pulses having a full-width at half-maximum (FWHM) pulse width and a duration of less than 1 ns.

4. The laser of claim 1, wherein the passive Q-switch layer comprises a cobalt-doped Spinel material.

5. A laser comprising:
a pump source that is configured to provide pump energy at a first wavelength; and
a laser cavity comprising:
a laser gain medium that is configured to receive the pump energy from the pump source and create gain at a second wavelength different from the first wavelength; and
a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
wherein the mode stripping portion is disposed between the laser gain medium and a laser outcoupling mirror.

6. A laser comprising:
a pump source that is configured to provide pump energy at a first wavelength; and
a laser cavity comprising:
a laser gain medium that is configured to receive the pump energy from the pump source and create gain at a second wavelength different from the first wavelength; and
a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
wherein the mode stripping portion is disposed on a reflective interface coating of a supporting substrate.

7. The laser of claim 6, wherein the supporting substrate with the mode stripping portion is arranged at an end of the laser gain medium.

8. The laser of claim 6, wherein the supporting substrate is an undoped YAG crystal.

9. The laser of claim 1, wherein the laser gain medium comprises at least two reflective surfaces that are spaced apart from one another to define ends of the laser gain medium.

10. The laser of claim 9, wherein the reflective surfaces comprise dichroic coatings.

11. A laser comprising:
a pump source that is configured to provide pump energy at a first wavelength; and
a laser cavity comprising:
a laser gain medium that is configured to receive the pump energy from the pump source and create gain at a second wavelength different from the first wavelength; and
a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
wherein the laser gain medium comprises at least two reflective surfaces that are spaced apart from one another to define ends of the laser gain medium; and
wherein the mode stripping portion is disposed at a pump end of the laser gain medium.

12. The laser of claim 11, wherein:
the reflective surface at the pump end comprises an anti-reflective coating at both a pump wavelength and a laser wavelength; and
the reflective surface at an output end of the laser gain medium comprises a highly reflective coating at the laser wavelength and a highly reflective coating at the pump wavelength.

13. A laser comprising:
a pump source that is configured to provide pump energy at a first wavelength; and
a laser cavity comprising:
a laser gain medium that is configured to receive the pump energy from the pump source and create gain at a second wavelength different from the first wavelength; and
a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
wherein the laser gain medium comprises at least two reflective surfaces that are spaced apart from one another to define ends of the laser gain medium; and
wherein the mode stripping portion is disposed at an output end of the laser gain medium.

14. The laser of claim 13, wherein:
the reflective surface at a pump end of the laser gain medium comprises a coating that is reflective at a pump wavelength and transmissive at a laser wavelength; and
the reflective surface at the output end of the laser gain medium comprises an anti-reflective coating at the laser wavelength and a highly reflective coating at the pump wavelength.

15. The laser of claim 1, wherein the laser gain medium is an optical fiber that comprises a fiber core and a fiber cladding surrounding the fiber core.

16. The laser of claim 15, wherein the fiber core has a diameter of 50 μm or more.

17. The laser of claim 15, wherein the fiber core comprises a phosphate glass material doped with Erbium and Ytterbium.

18. The laser of claim 15, wherein the fiber cladding comprises an undoped glass material.

19. The laser of claim 15, wherein the pump source is configured to pump the pump energy via the core.

20. The laser of claim 15, wherein the pump source is configured to pump the pump energy via the cladding.

21. A laser comprising:
a pump source that is configured to provide pump energy at a first wavelength; and
a laser cavity comprising:
   a laser gain medium that is configured to receive the pump energy from the pump source and create gain at a second wavelength different from the first wavelength;
   a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity; and
   a ferrule assembly surrounding the laser gain medium, wherein the ferrule assembly is configured to hold the laser gain medium in place and remove heat generated in the laser gain medium.

22. A laser comprising:
a pump source that is configured to provide pump energy at a first wavelength; and
a laser cavity comprising:
   a laser gain medium that is configured to receive the pump energy from the pump source and create gain at a second wavelength different from the first wavelength; and
   a mode stripping portion that is configured to discriminate against any higher-order fiber modes so as to generate a laser output having a substantially diffraction limited beam in a single transverse mode at the second wavelength, wherein the mode stripping portion is configured to allow only a lowest-order fiber mode to build up in the laser cavity;
wherein a length of the mode stripping portion is selected such that a round-trip loss of the lowest-order fiber mode is less than a round-trip loss of a next higher-order fiber mode so that only the lowest-order fiber mode resonates in the laser cavity.

23. A method for producing a substantially single mode laser, the method comprising:
providing pump energy at a first wavelength to a laser gain medium in a laser cavity to create gain at a second wavelength different from the first wavelength, the laser gain medium coupled to a mode stripping portion that favors a lowest-order fiber mode while discriminating against any higher-order modes; and
using the mode stripping portion to discriminate against the higher-order fiber modes and to allow only the lowest-order fiber mode to build up in the laser cavity so as to generate a laser output having a substantially diffraction limited beam in a single transverse mode at the second wavelength;
wherein the mode stripping portion comprises a passive Q-switch layer.

24. The method of claim 23, wherein the mode stripping portion is disposed at an end of the laser gain medium.

* * * * *